(12) United States Patent
Uchiyama

(10) Patent No.: US 12,117,081 B2
(45) Date of Patent: Oct. 15, 2024

(54) GASKET MOUNTING STRUCTURE

(71) Applicant: NOK CORPORATION, Tokyo (JP)

(72) Inventor: Masasuke Uchiyama, Makinohara (JP)

(73) Assignee: NOK CORPORATION, Tokyo (JP)

( * ) Notice: Subject to any disclaimer, the term of this patent is extended or adjusted under 35 U.S.C. 154(b) by 127 days.

(21) Appl. No.: 17/801,515

(22) PCT Filed: Apr. 13, 2021

(86) PCT No.: PCT/JP2021/015264
§ 371 (c)(1),
(2) Date: Aug. 22, 2022

(87) PCT Pub. No.: WO2021/215295
PCT Pub. Date: Oct. 28, 2021

(65) Prior Publication Data
US 2023/0003302 A1 Jan. 5, 2023

(30) Foreign Application Priority Data
Apr. 23, 2020 (JP) .................. 2020-076863

(51) Int. Cl.
*F16J 15/3268* (2016.01)
*B25B 27/00* (2006.01)
(Continued)

(52) U.S. Cl.
CPC ....... *F16J 15/3268* (2013.01); *B25B 27/0028* (2013.01); *F16J 15/121* (2013.01); *F16J 15/3252* (2013.01)

(58) Field of Classification Search
CPC .. B25B 27/0028; F16J 15/121; F16J 15/3252; F16J 15/3268
See application file for complete search history.

(56) References Cited

U.S. PATENT DOCUMENTS 2,861,330 A * 11/1958 Kratz ................. B25B 27/02
29/282
2,998,644 A * 9/1961 Thill ................ B25B 27/0028
29/280
(Continued)

FOREIGN PATENT DOCUMENTS

JP S62-019178 U 2/1987
JP H03-130330 U 12/1991
(Continued)

*Primary Examiner* — Nicholas L Foster
(74) *Attorney, Agent, or Firm* — Harness, Dickey & Pierce, P.L.C.

(57) ABSTRACT

Provided is a gasket mounting structure capable of preventing a gasket from being mounted in a wrong direction. The gasket mounting structure is configured such that, when a jig 200 is inserted into a gasket 100 from a large-diameter inner peripheral surface portion 124 side, a small-diameter outer peripheral surface portion 210 is press-fitted into an inner peripheral surface of a seal projection 122 to result in a state in which the gasket 100 is held by the jig 200 and, when the jig 200 is inserted into the gasket 100 from a small-diameter inner peripheral surface portion 123 side, the small-diameter outer peripheral surface portion 210 does not reach a position at which the small-diameter outer peripheral surface portion 210 can come into contact with the seal projection 122.

3 Claims, 10 Drawing Sheets

(51) Int. Cl.
*F16J 15/12* (2006.01)
*F16J 15/3252* (2016.01)

(56) References Cited

U.S. PATENT DOCUMENTS

| | | | | |
|---|---|---|---|---|
| 3,030,702 A * | 4/1962 | Fowler | ............... | B25B 27/0028 |
| | | | | 29/280 |
| 3,165,949 A * | 1/1965 | Thill | ............... | B25B 27/0028 |
| | | | | 29/275 |
| 4,218,813 A * | 8/1980 | Cather, Jr. | ........... | B25B 27/0028 |
| | | | | 29/464 |
| 4,550,486 A * | 11/1985 | Yarimizu | ............ | B25B 27/0028 |
| | | | | 29/451 |
| 4,551,898 A * | 11/1985 | Provost | ............... | B25B 27/0028 |
| | | | | 29/263 |
| 4,815,884 A * | 3/1989 | Halliday, Jr. | ....... | B25B 27/0028 |
| | | | | 403/17 |
| 5,013,050 A * | 5/1991 | Curtis | ............... | F16J 15/3268 |
| | | | | 29/464 |
| 5,052,695 A * | 10/1991 | Curtis | ............... | F16J 15/3268 |
| | | | | 277/551 |
| 5,875,550 A * | 3/1999 | Kohn | ............... | B60B 37/10 |
| | | | | 29/898.07 |
| 5,893,202 A * | 4/1999 | Graham | ............ | B25B 27/0028 |
| | | | | 29/402.02 |
| 7,096,551 B2 | 8/2006 | Lackowski, II | .... | B25B 27/0028 |
| | | | | 29/235 |
| 7,284,759 B2 * | 10/2007 | Heldmann | ............... | F16J 15/32 |
| | | | | 277/351 |
| 7,651,102 B2 * | 1/2010 | Heldmann | ........... | F16J 15/3268 |
| | | | | 29/280 |
| 7,900,357 B2 * | 3/2011 | Hopper | ............... | F16J 15/3268 |
| | | | | 29/898.07 |
| 7,959,157 B2 * | 6/2011 | Dobbs | ............... | F16J 15/3268 |
| | | | | 277/572 |
| 8,028,852 B2 * | 10/2011 | London | ............... | F16L 57/005 |
| | | | | 220/295 |
| 8,112,887 B2 * | 2/2012 | London | ............... | G09F 3/0323 |
| | | | | 29/888.3 |
| 8,292,302 B2 * | 10/2012 | Heldmann | ............... | F16J 15/32 |
| | | | | 277/551 |
| 8,328,200 B2 * | 12/2012 | Battles | ............... | F16J 15/16 |
| | | | | 277/572 |
| 8,474,828 B2 * | 7/2013 | Heldmann | ........... | B25B 27/0028 |
| | | | | 277/551 |
| 8,756,784 B2 * | 6/2014 | Harmon | ............... | F16J 15/3268 |
| | | | | 29/463 |
| 8,910,948 B2 * | 12/2014 | Heldmann | ............... | F16J 15/32 |
| | | | | 277/551 |
| 8,918,972 B2 * | 12/2014 | Battles | ............... | F16J 15/3268 |
| | | | | 277/551 |
| 10,029,356 B2 * | 7/2018 | Colineau | ............... | F16J 15/02 |
| 10,612,660 B2 * | 4/2020 | Yanagi | ............... | F16J 15/125 |
| 11,685,030 B2 * | 6/2023 | Fujii | ............... | F16J 15/3252 |
| | | | | 277/572 |
| 11,802,622 B2 * | 10/2023 | Meister | ............... | F16J 15/324 |
| 2005/0109889 A1 * | 5/2005 | Heldmann | ........... | B25B 27/0028 |
| | | | | 248/74.1 |
| 2005/0258181 A1 * | 11/2005 | Heldmann | ........... | B25B 27/0028 |
| | | | | 220/837 |
| 2008/0230999 A1 * | 9/2008 | Hopper | ............... | F16J 15/3268 |
| | | | | 277/551 |
| 2010/0084417 A1 * | 4/2010 | Heldmann | ............... | F16J 15/32 |
| | | | | 220/200 |
| 2011/0179620 A1 * | 7/2011 | Harmon | ............... | F16J 15/3268 |
| | | | | 49/463 |
| 2012/0228834 A1 * | 9/2012 | Heldmann | ........... | F16J 15/3268 |
| | | | | 277/551 |
| 2013/0256995 A1 * | 10/2013 | Heldmann | ............... | F16J 15/32 |
| | | | | 277/551 |
| 2016/0151896 A1 * | 6/2016 | Colineau | ............... | F16J 15/02 |
| | | | | 277/630 |
| 2019/0032783 A1 * | 1/2019 | Yanagi | ............... | F16J 15/12 |
| 2021/0164570 A1 * | 6/2021 | Amano | ............... | F16J 15/121 |
| 2022/0221058 A1 * | 7/2022 | Uchiyama | ............ | F16J 15/125 |
| 2022/0333689 A1 * | 10/2022 | Akiyama | ............... | F16J 15/121 |
| 2022/0397198 A1 * | 12/2022 | Fujii | ............... | B25B 27/0028 |

FOREIGN PATENT DOCUMENTS

| | | |
|---|---|---|
| JP | H06-063234 U | 9/1994 |
| JP | 2005-205558 A | 8/2005 |
| JP | 2006-207715 A | 8/2006 |
| JP | 2006-300114 A | 11/2006 |

* cited by examiner

GASKET MOUNTING STRUCTURE

CROSS-REFERENCE TO RELATED APPLICATIONS

This application is a National Stage of International Application No. PCT/JP2021/015264, filed Apr. 13, 2021 (now WO 2021/215295A1), which claims priority to Japanese Application No. 2020-076863, filed Apr. 23, 2020. The entire disclosures of each of the above applications are incorporated herein by reference.

FIELD

The present disclosure relates to a gasket mounting structure for sealing an annular gap.

BACKGROUND

Conventionally, a gasket for sealing an annular gap has been known. Referring to FIGS. 9A and 9B, a description will be given of a gasket according to a conventional example. FIGS. 9A and 9B are schematic cross-sectional views of a sealing structure including the gasket according to the conventional example. A gasket 700 illustrated in the figures is used to seal an annular gap between a housing 600 and a shaft 500 inserted through an insertion hole 610 provided in the housing 600. The shaft 500 is inserted from a to-be-sealed side (O), which corresponds to an area to be sealed, toward an opposite side (A) thereof. Before the shaft 500 is inserted through the insertion hole 610, the gasket 700 is preliminarily mounted in the insertion hole 610 by using a jig not shown.

As illustrated in FIG. 9A, the gasket 700 includes a reinforcing ring 710 and a seal main body 720 made of an elastic material and provided integrally with the reinforcing ring 710. The reinforcing ring 710 includes a cylindrical portion 711 and a radially inward flange 712 provided on an end of the cylindrical portion 711 located on the to-be-sealed side (O). The seal main body 720 further integrally includes an outer peripheral seal portion 721 to be fitted and fixed to an inner peripheral surface of the insertion hole 610 and a seal projection 722 to be brought into close contact with an outer peripheral surface of the shaft 500.

The gasket 700 thus configured is mounted in the insertion hole 610 such that the radially inward flange 712 of the reinforcing ring 710 faces the to-be-sealed side (O) (see FIG. 9A). However, the gasket 700 can also be mounted such that the radially inward flange 712 of the reinforcing ring 710 faces the opposite side (A) of the to-be-sealed side (O) (see FIG. 9B). Although the gasket 700 thus mounted to face the opposite side (A) may have a sealing ability, the radially inward flange 712 of the reinforcing ring 710 may be exposed to atmospheric air or the like to rust.

As preventive measures against a wrong mounting direction of the gasket 700, it can be considered to paint one of both end surfaces of the gasket 700 and check the presence or absence of the paint after mounting of the gasket 700. However, the measures require an application of the paint and the checking thereof, resulting in increased cost.

CITATION LIST

Patent Literature

[PTL 1] Japanese Patent Application Publication No. 2006-207715

SUMMARY

Technical Problem

An object of the present disclosure is to provide a gasket mounting structure that can prevent a gasket from being mounted in a wrong direction.

Solution to Problem

To achieve the object described above, the present disclosure has adopted the following means.

A gasket mounting structure of the present disclosure includes: a gasket configured to seal an annular gap between a housing and a shaft to be inserted into an insertion hole provided in the housing from a to-be-sealed side, which corresponds to an object to be sealed, toward an opposite side thereof; and a jig configured to be used in preliminarily mounting the gasket in the insertion hole before the shaft is inserted through the insertion hole, wherein the gasket includes: a reinforcing ring; and a seal main body made of an elastic material and provided integrally with the reinforcing ring, the seal main body integrally including: an outer peripheral seal portion to be fitted and fixed to an inner peripheral surface of the insertion hole; and a seal projection to be brought into close contact with an outer peripheral surface of the shaft, of an inner peripheral surface of the seal main body, the to-be-sealed side relative to the seal projection is formed of a small-diameter inner peripheral surface portion, and the opposite side to the to-be-sealed side relative to the seal projection is formed of a large-diameter inner peripheral surface portion having an inner diameter larger than that of the small-diameter inner peripheral surface portion, the jig includes: a small-diameter outer peripheral surface portion configured to be press-fitted into an inner peripheral surface of the seal projection so as to hold the gasket; an intermediate-diameter outer peripheral surface portion having an outer diameter larger than the inner diameter of the small-diameter inner peripheral surface portion, smaller than the inner diameter of the large-diameter inner peripheral surface portion, and larger than an outer diameter of the small-diameter outer peripheral surface portion; and a large-diameter outer peripheral surface portion having an outer diameter larger than the inner diameter of the large-diameter inner peripheral surface portion and larger than the outer diameter of the intermediate-diameter outer peripheral surface portion, and the gasket mounting structure is configured such that, when the jig is inserted into the gasket from the large-diameter inner peripheral surface portion side, a stepped surface between the intermediate-diameter outer peripheral surface portion and the large-diameter outer peripheral surface portion abuts on an end surface of the gasket located on the large-diameter inner peripheral surface portion side to press-fit the small-diameter outer peripheral surface portion into the inner peripheral surface of the seal projection and result in a state in which the gasket is held by the jig, and, when the jig is inserted into the gasket from the small-diameter inner peripheral surface portion side, a stepped surface between the small-diameter outer peripheral surface portion and the intermediate-diameter outer peripheral surface portion abuts on an end surface of the gasket located on the small-diameter inner peripheral surface portion side to prevent the small-diameter outer peripheral surface portion from reaching a position at which the small-diameter outer peripheral surface portion can come into contact with the seal projection.

According to the present disclosure, when the jig is inserted into the gasket from the large-diameter inner peripheral surface portion side, the gasket is held by the jig. Meanwhile, when the jig is inserted into the gasket from the small-diameter inner peripheral surface portion side, the gasket is not held by the jig. Accordingly, the mounting structure of the present disclosure can prevent the gasket from being mounted in a wrong direction in a structure in which the gasket is to be mounted in the insertion hole from the small-diameter inner peripheral surface portion side.

Another gasket mounting structure of the present disclosure includes: a gasket configured to seal an annular gap between a housing and a shaft to be inserted into an insertion hole provided in the housing from a to-be-sealed side, which corresponds to an object to be sealed, toward an opposite side thereof; and a jig configured to be used in preliminarily mounting the gasket in the insertion hole before the shaft is inserted through the insertion hole, wherein the gasket includes: a reinforcing ring; and a seal main body made of an elastic material and provided integrally with the reinforcing ring, the seal main body integrally including: an outer peripheral seal portion to be fitted and fixed to an inner peripheral surface of the insertion hole; and a seal projection to be brought into close contact with an outer peripheral surface of the shaft, of an inner peripheral surface of the seal main body, the to-be-sealed side relative to the seal projection is formed of a small-diameter inner peripheral surface portion, and the opposite side to the to-be-sealed side relative to the seal projection is formed of a large-diameter inner peripheral surface portion having an inner diameter larger than that of the small-diameter inner peripheral surface portion, the jig includes: a small-diameter outer peripheral surface portion configured to be press-fitted into an inner peripheral surface of the small-diameter inner peripheral surface portion so as to hold the gasket; and a large-diameter outer peripheral surface portion having an outer diameter larger than the inner diameter of the large-diameter inner peripheral surface portion and larger than an outer diameter of the small-diameter outer peripheral surface portion, and the gasket mounting structure is configured such that, when the jig is inserted into the gasket from the small-diameter inner peripheral surface portion side, a stepped surface between the small-diameter outer peripheral surface portion and the large-diameter outer peripheral surface portion abuts on an end surface of the gasket located on the small-diameter inner peripheral surface portion side to press-fit the small-diameter outer peripheral surface portion into the inner peripheral surface of the small-diameter inner peripheral surface portion and result in a state in which the gasket is held by the jig, and, when the jig is inserted into the gasket from the large-diameter inner peripheral surface portion side, the stepped surface between the small-diameter outer peripheral surface portion and the large-diameter outer peripheral surface portion abuts on an end surface of the gasket located on the large-diameter inner peripheral surface portion side to form a space between the small-diameter outer peripheral surface portion and the large-diameter inner peripheral surface portion.

According to the present disclosure, when the jig is inserted into the gasket from the small-diameter inner peripheral surface portion side, the gasket is held by the jig. Meanwhile, when the jig is inserted into the gasket from the large-diameter inner peripheral surface portion side, the gasket is not held by the jig. Accordingly, the mounting structure of the present disclosure can prevent the gasket from being mounted in a wrong direction in a structure in which the gasket is to be mounted in the insertion hole from the large-diameter inner peripheral surface portion side.

A plurality of projections to be compressed against the small-diameter outer peripheral surface portion may be provided at intervals in a circumferential direction at the small-diameter inner peripheral surface portion.

Accordingly, the small-diameter outer peripheral surface portion of the jig can be press-fitted into the inner peripheral surface of the small-diameter inner peripheral surface portion of the gasket without increasing a force required for the press-fitting and hold the gasket.

Advantageous Effects of the Disclosure

As described above, according to the present disclosure, it is possible to prevent the gasket from being mounted in a wrong direction.

DRAWINGS

DETAILED DESCRIPTION

Figure 1:
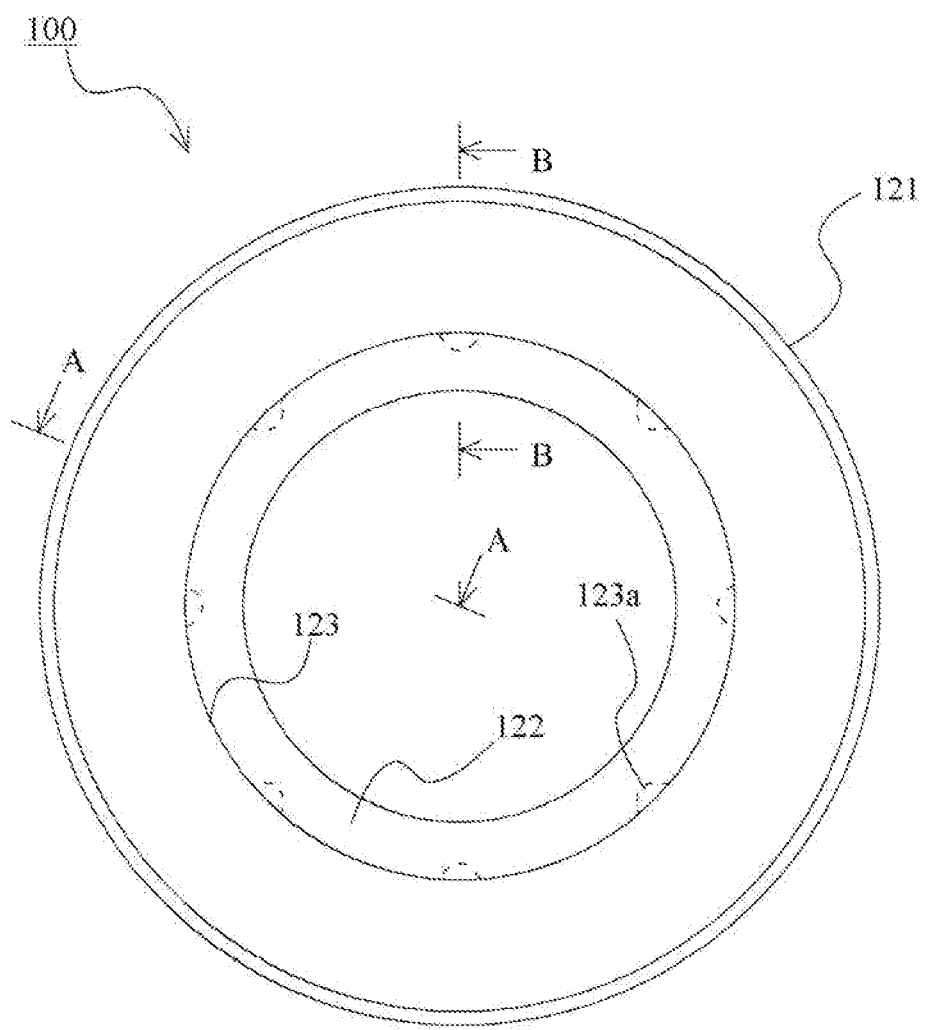
FIG. 1 is a plan view of a gasket according to each of first and second embodiments of the present disclosure.

Referring to the drawings, forms for carrying out this disclosure will be illustratively described below in detail on the basis of embodiments thereof. However, dimensions, materials, shapes, and relative positioning of components described in the embodiments and the like are not intended to limit the scope of the disclosure to the following embodiments unless particularly described.

First Embodiment

Referring to FIGS. 1 to 5, a description will be given of a gasket mounting structure according to the first embodiment of the present disclosure. The gasket according to the present embodiment can appropriately be applied as, e.g., a seal for an automobile electric oil pump. However, the gasket according to the present embodiment is applicable not only to a sealing structure of each part of an automobile, but also to a sealing structure in a general industrial machine.

<Gasket>

Figure 2:
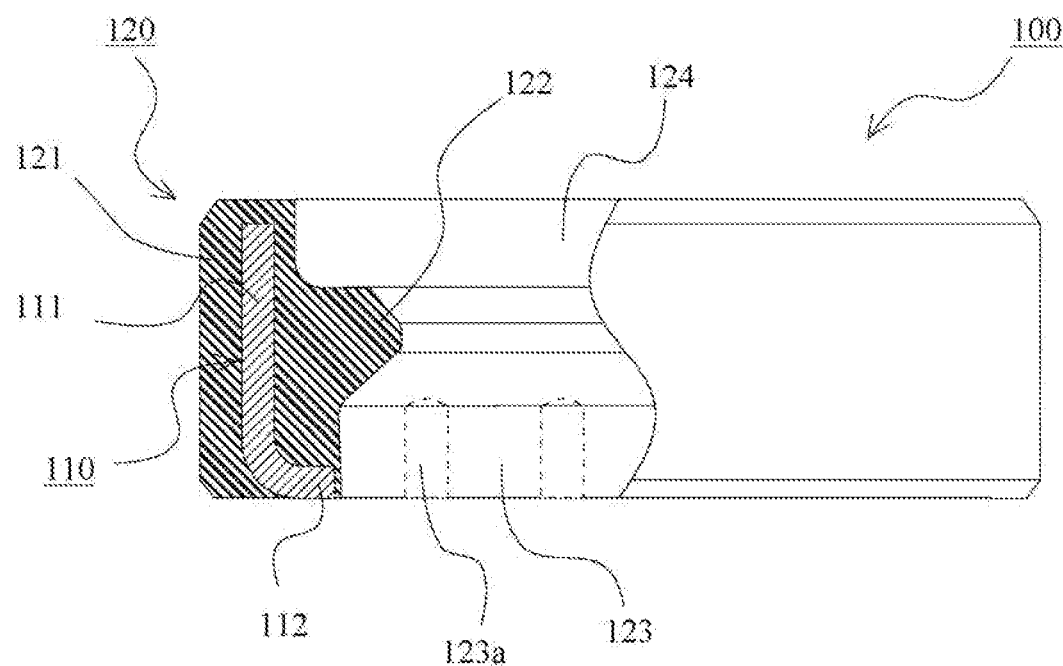
FIG. 2 is a partially broken cross-sectional view of the gasket according to each of the first and second embodiments of the present disclosure.

Referring particularly to FIGS. 1 and 2, a description will be given of the gasket according to the present embodiment. FIG. 1 is a plan view of the gasket according to the first embodiment of the present disclosure. FIG. 2 is a partially broken cross-sectional view of the gasket according to the first embodiment of the present disclosure. Note that the cross-sectional view in FIG. 2 is a cross-sectional view along AA in FIG. 1. Additionally, a portion (projection 123a) indicated by dotted lines in FIGS. 1 and 2 is a portion related to a configuration of a gasket according to the second embodiment.

A gasket 100 according to the present embodiment includes a reinforcing ring 110 formed of metal or the like and a seal main body 120 made of an elastic material (made of, e.g., rubber) provided integrally with the reinforcing ring 110. In one embodiment, the seal main body 120 is molded by insert molding using the reinforcing ring 110 as an insert part to obtain the gasket 100.

The reinforcing ring 110 includes a cylindrical portion 111 and a radially inward flange 112 provided at one end (end of a sealing structure located on a to-be-sealed side) of the cylindrical portion 111.

The seal main body 120 integrally includes an outer peripheral seal portion 121 on an outer peripheral surface side and a seal projection 122 on an inner peripheral surface side. Of an inner peripheral surface of the seal main body 120, one end side (the to-be-sealed side of the sealing structure) relative to the seal projection 122 is formed of a small-diameter inner peripheral surface portion 123 and another end side (opposite to the to-be-sealed side) relative to the seal projection 122 is formed of a large-diameter inner peripheral surface portion 124 having an inner diameter larger than that of the small-diameter inner peripheral surface portion 123.

<Sealing Structure>

Figure 3:
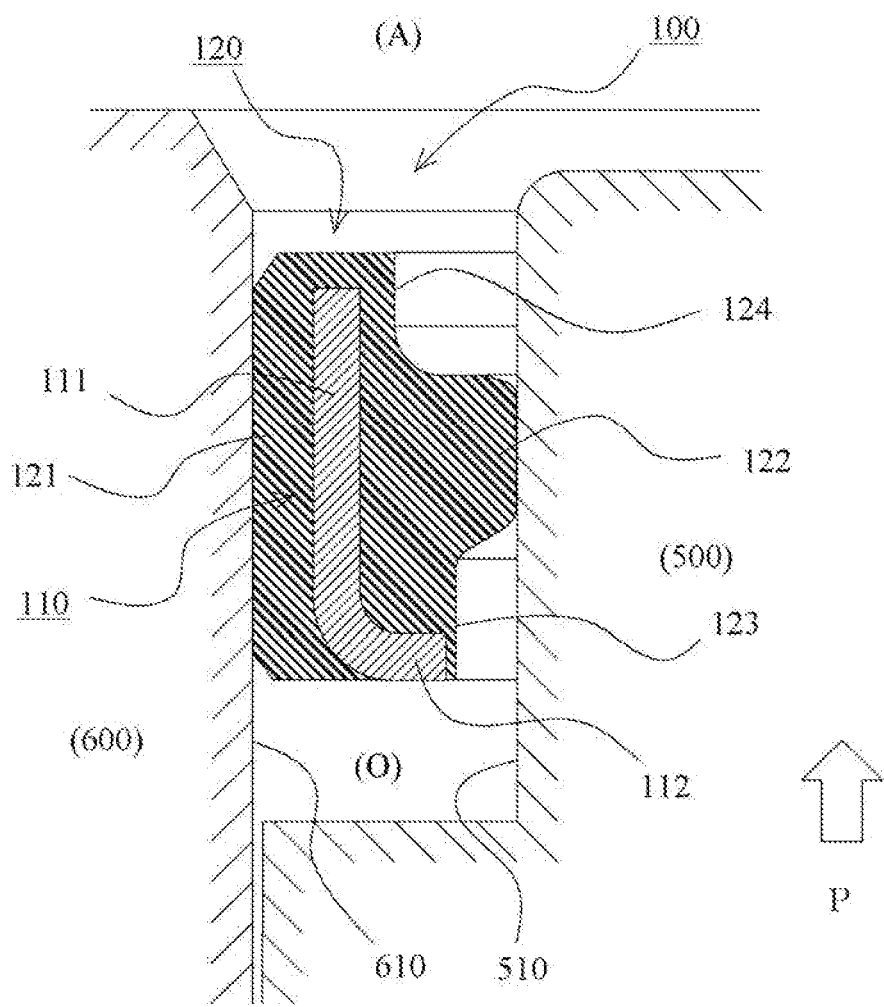
FIG. 3 is a schematic cross-sectional view of a sealing structure including the gasket according to the first embodiment of the present disclosure.

Referring particularly to FIG. 3, a description will be given of the sealing structure including the gasket according to the present embodiment. FIG. 3 is a schematic cross-sectional view of the sealing structure including the gasket according to the first embodiment of the present disclosure. The sealing structure according to the present embodiment includes a housing 600, a shaft 500 to be inserted through an insertion hole 610 provided in the housing 600, and the gasket 100 sealing an annular gap between the housing 600 and the shaft 500. In the present embodiment, the shaft 500 is configured to be inserted from a to-be-sealed side (O), which corresponds to an object to be sealed, toward an opposite side (A) thereof. In other words, in FIG. 3, the shaft 500 is inserted through the insertion hole 610 in a direction indicated by an arrow P. Note that, before the shaft 500 is inserted through the insertion hole 610, the gasket 100 is preliminarily mounted in the insertion hole 610. A fluid to be sealed such as oil is sealed on the to-be-sealed side (O), while the opposite side (A) is exposed to, e.g., atmospheric air.

In the sealing structure configured as described above, the outer peripheral seal portion 121 is fitted and fixed to an inner peripheral surface of the insertion hole 610 to bring the seal projection 122 into close contact with an outer peripheral surface 510 of the shaft 500, and consequently the annular gap between the housing 600 and the shaft 500 is sealed by the gasket 100.

<Gasket Mounting Structure>

Figure 4:
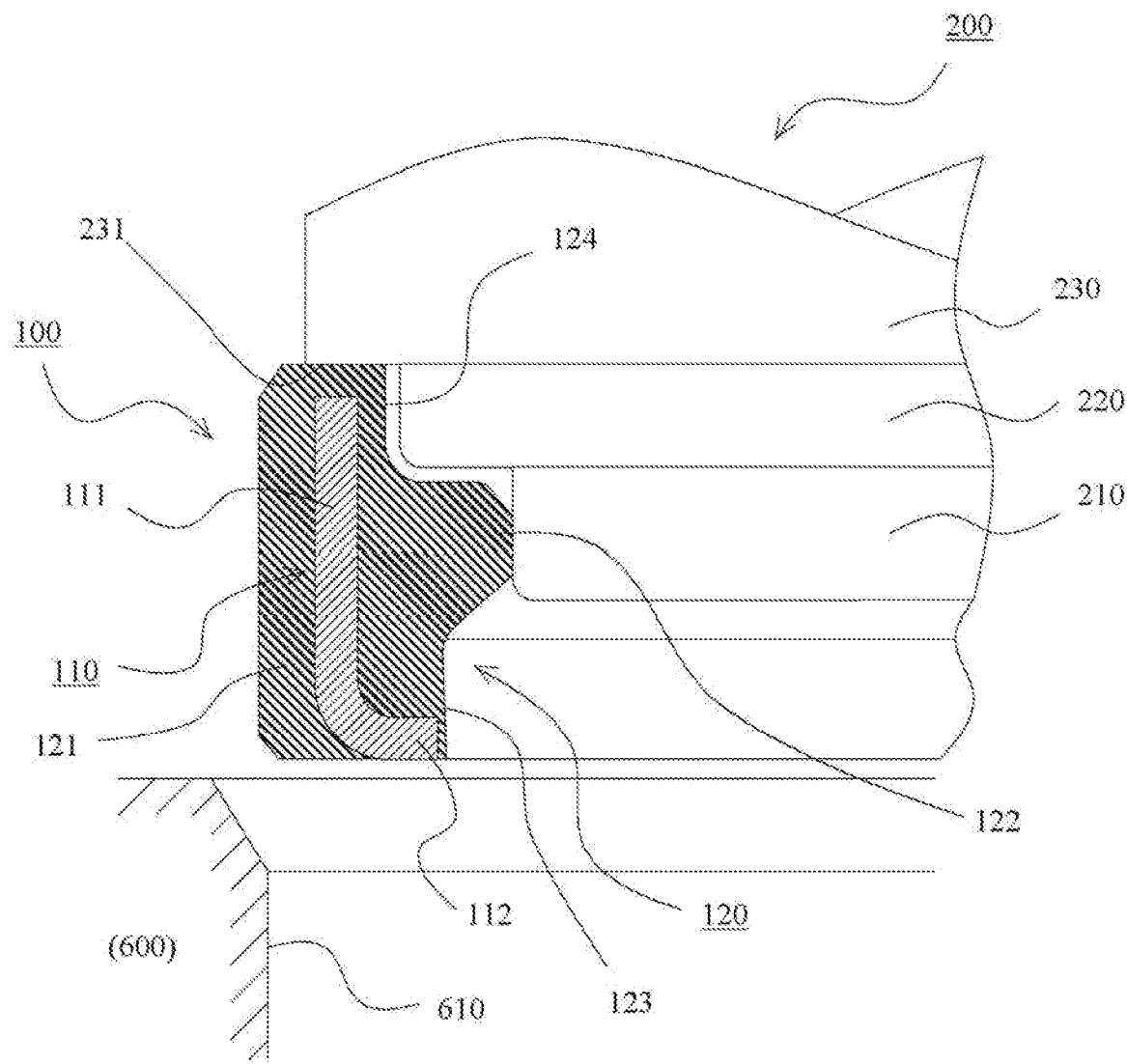
FIG. 4 is a schematic cross-sectional view illustrating a situation where the gasket is being mounted according to the first embodiment of the present disclosure.
Figure 5:
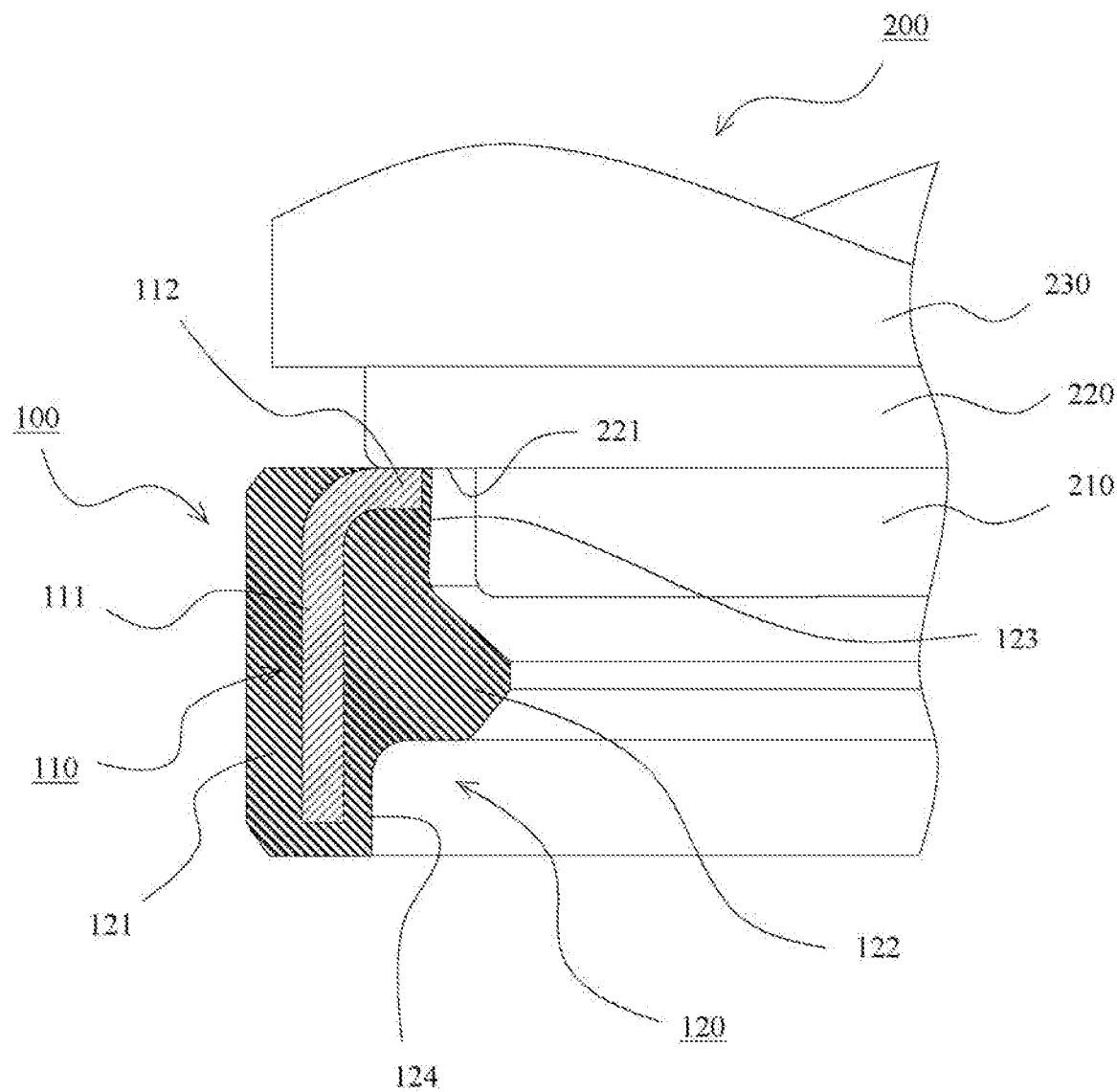
FIG. 5 is a schematic cross-sectional view illustrating a situation where a jig is inserted in a wrong direction into the gasket according to the first embodiment of the present disclosure.

Referring particularly to FIGS. 4 and 5, a description will be given of a gasket mounting structure according to the present embodiment. FIG. 4 is a schematic cross-sectional view illustrating a situation where the gasket is being mounted according to the first embodiment of the present disclosure. FIG. 5 is a schematic cross-sectional view illustrating a situation where a jig is inserted in a wrong direction into the gasket according to the first embodiment of the present disclosure.

In the present embodiment, the gasket 100 is configured to be mounted in the insertion hole 610 of the housing 600 from the small-diameter inner peripheral surface portion 123 side. In other words, in the present embodiment, the gasket 100 is inserted using a jig 200 through the insertion hole 610 in a direction opposite to the direction in which the shaft 500 is inserted through the insertion hole 610.

The jig 200 includes a small-diameter outer peripheral surface portion 210, an intermediate-diameter outer peripheral surface portion 220, and a large-diameter outer peripheral surface portion 230 in order of increasing distance from a leading end side. The small-diameter outer peripheral surface portion 210 is configured to hold the gasket 100 by being press-fitted into an inner peripheral surface of the seal projection 122 of the gasket 100. The intermediate-diameter outer peripheral surface portion 220 is configured to have an outer diameter which is larger than the inner diameter of the small-diameter inner peripheral surface portion 123 of the gasket 100, smaller than the inner diameter of the large-diameter inner peripheral surface portion 124, and larger than an outer diameter of the small-diameter outer peripheral surface portion 210 of the jig 200. The large-diameter outer peripheral surface portion 230 has an outer diameter which is larger than the inner diameter of the large-diameter inner peripheral surface portion 124 of the gasket 100 and larger than the outer diameter of the intermediate-diameter outer peripheral surface portion 220 of the jig 200.

FIG. 4 illustrates a situation where the jig 200 is inserted into the gasket 100 from the large-diameter inner peripheral surface portion 124 side. In this case, a stepped surface 231 between the intermediate-diameter outer peripheral surface portion 220 and the large-diameter outer peripheral surface portion 230 abuts on an end surface of the gasket 100 located on the large-diameter inner peripheral surface portion 124 side to press-fit the small-diameter outer peripheral surface portion 210 into the inner peripheral surface of the seal projection 122. This results in a state in which the gasket 100 is held by the jig 200. By inserting the gasket 100 into the insertion hole 610 of the housing 600 in a state in which the gasket 100 is thus held by the jig 200, it is possible to mount the gasket 100 in the insertion hole 610.

FIG. 5 illustrates a situation where the jig 200 is inserted into the gasket 100 from the small-diameter inner peripheral surface portion 123 side. In this case, a stepped surface 221 between the small-diameter outer peripheral surface portion 210 and the intermediate-diameter outer peripheral surface portion 220 abuts on the end surface of the gasket 100 located on the small-diameter inner peripheral surface portion 123 side to prevent the small-diameter outer peripheral surface portion 210 from reaching a position at which the small-diameter outer peripheral surface portion 210 can come into contact with the seal projection 122. Consequently, the gasket 100 cannot be held by the jig 200.

<Advantages of Gasket Mounting Structure According to Present Embodiment>

In the mounting structure for the gasket 100 according to the present embodiment, when the jig 200 is inserted into the gasket 100 from the large-diameter inner peripheral surface portion 124 side, the gasket 100 is held by the jig 200. Meanwhile, when the jig 200 is inserted into the gasket 100 from the small-diameter inner peripheral surface portion 123 side, the gasket 100 is not held by the jig 200. This prevents the gasket 100 from being mounted in a wrong direction in a structure in which the gasket 100 is mounted in the insertion hole 610 from the small-diameter inner peripheral surface portion 123 side as in the present embodiment. This eliminates the need to paint the gasket 100 to prevent the gasket 100 from being mounted in a wrong direction. Since the gasket 100 is more reliably mounted in a correct direction, it is also possible to prevent the reinforcing ring 110 from rusting.

Second Embodiment

Figure 6:
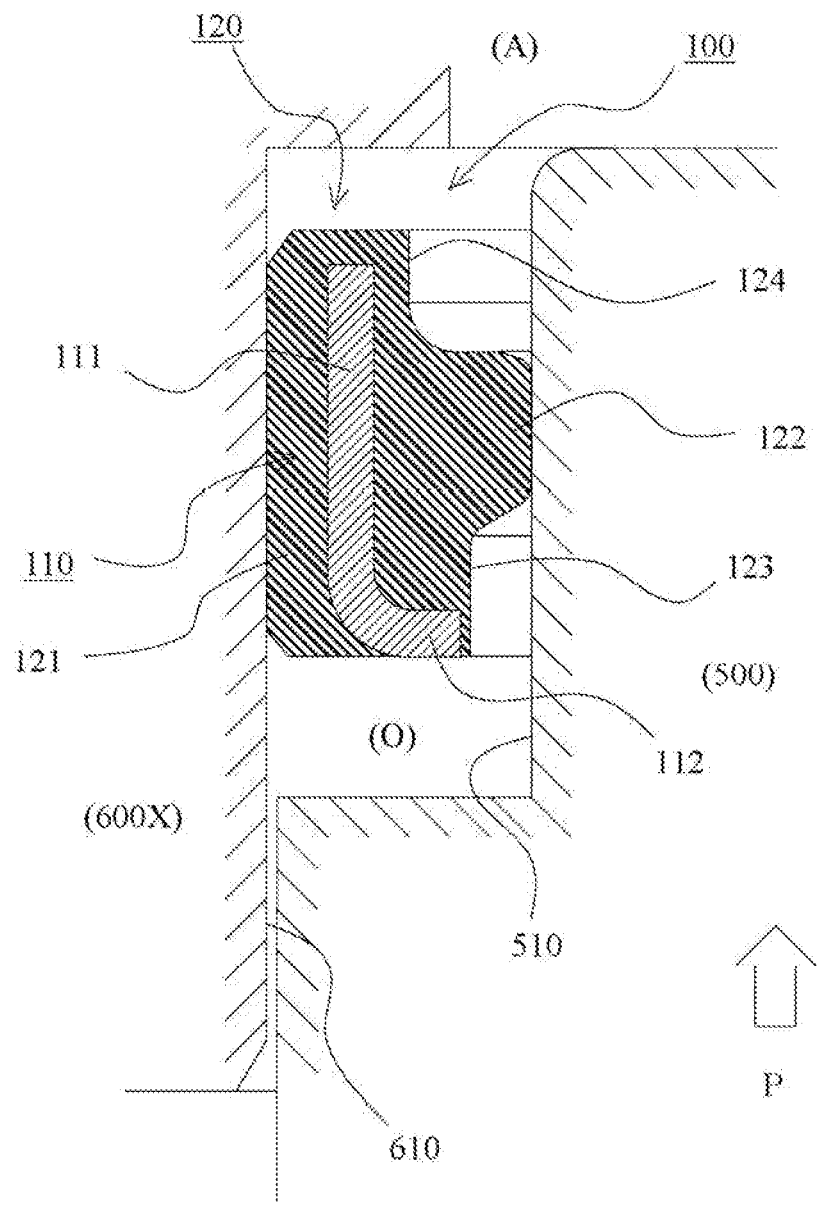
FIG. 6 is a schematic cross-sectional view of a sealing structure including the gasket according to the second embodiment of the present disclosure.

FIGS. 1, 2, and 6 to 8 illustrate the second embodiment of the present disclosure. In the first embodiment described above, the structure in which the gasket is mounted in the insertion hole from the small-diameter inner peripheral surface portion side is shown. Meanwhile, in the present embodiment, a structure in which the gasket is mounted in the insertion hole from the large-diameter inner peripheral surface portion side is shown. A basic configuration and effects are otherwise the same as in the first embodiment, and therefore the same components are denoted by the same reference signs and a description thereof will be omitted as appropriate.
<Gasket>
Referring particularly to FIGS. 1 and 2, a description will be given of the gasket according to the present embodiment. The gasket 100 according to the present embodiment has the same basic configuration as that of the gasket 100 described above in the first embodiment. The present embodiment is different from the first embodiment in that, at the small-diameter inner peripheral surface portion 123 provided in the inner peripheral surface of the seal main body 120, a plurality of the projections 123a indicated by dotted lines are provided at intervals in a circumferential direction.
<Sealing Structure>
Referring particularly to FIG. 6, a description will be given of a sealing structure including the gasket according to the present embodiment. FIG. 6 is a schematic cross-sectional view of the sealing structure including the gasket according to the second embodiment of the present disclosure. The sealing structure according to the present embodiment also includes a housing 600X, the shaft 500 to be inserted through the insertion hole 610 provided in the housing 600X, and the gasket 100 sealing an annular gap between the housing 600X and the shaft 500. Additionally, in the present embodiment also, the shaft 500 is configured to be inserted from the to-be-sealed side (O), which corresponds to the object to be sealed, toward the opposite side (A) thereof. In other words, in FIG. 6, the shaft 500 is inserted through the insertion hole 610 in the direction indicated by the arrow P. Note that, before the shaft 500 is inserted through the insertion hole 610, the gasket 100 is preliminarily mounted in the insertion hole 610.

In the sealing structure configured as described above, the outer peripheral seal portion 121 is fitted and fixed to the inner peripheral surface of the insertion hole 610 to bring the seal projection 122 into close contact with the outer peripheral surface 510 of the shaft 500, and consequently the annular gap between the housing 600X and the shaft 500 is sealed by the gasket 100.

Figure 7:
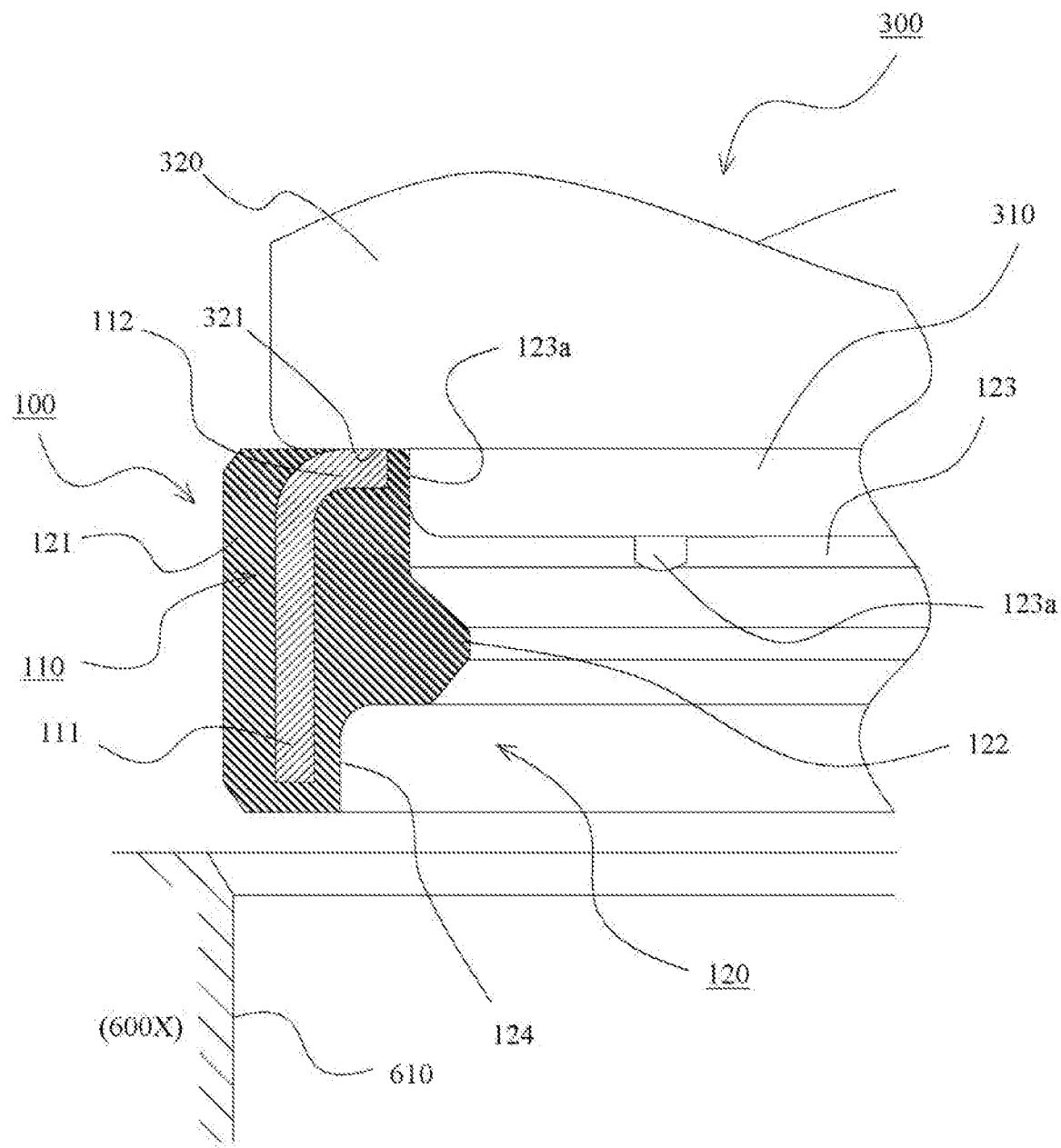
FIG. 7 is a schematic cross-sectional view illustrating a situation where the gasket is being mounted according to the second embodiment of the present disclosure.
Figure 8:
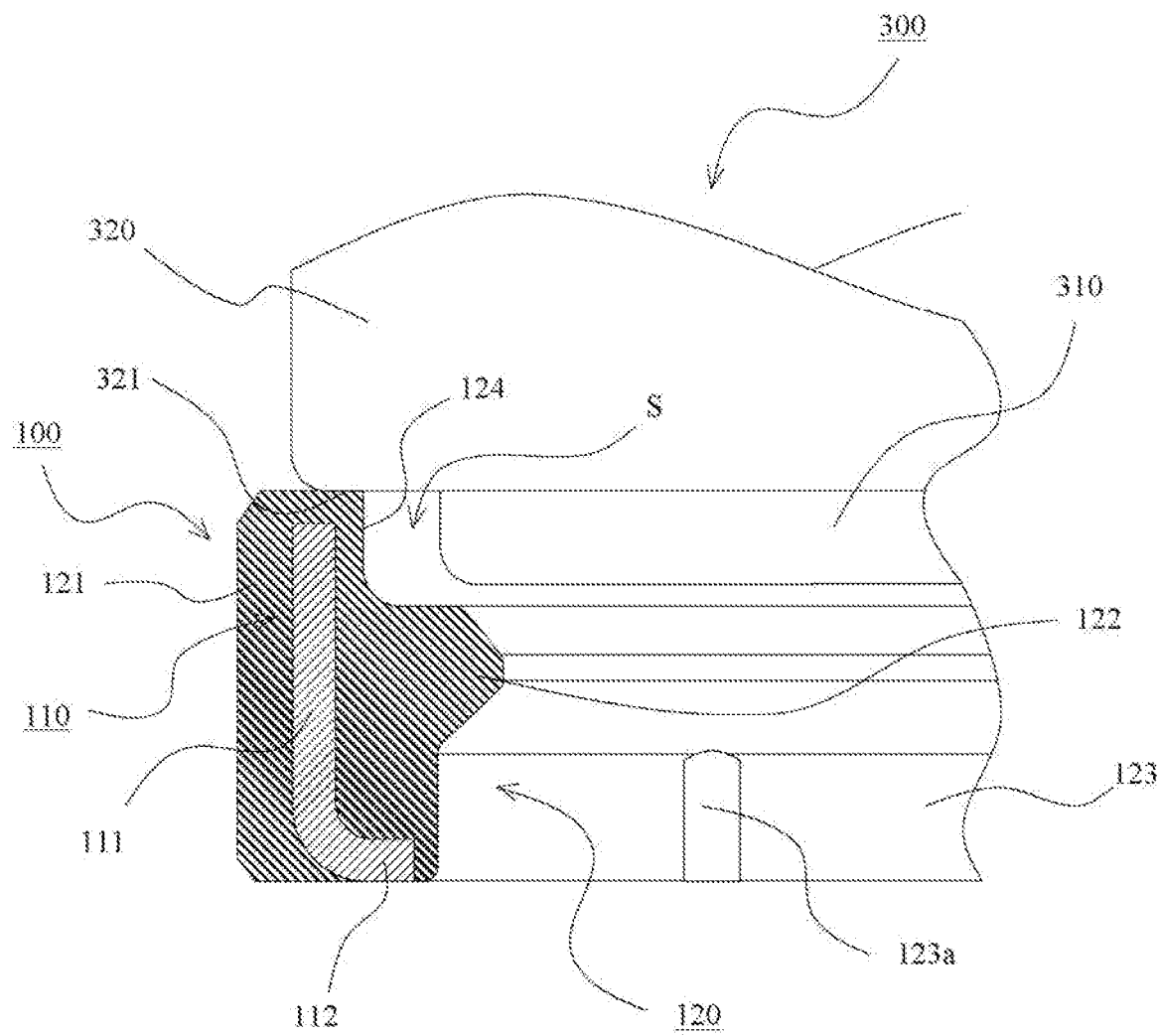
FIG. 8 is a schematic cross-sectional view illustrating a situation where a jig is inserted in a wrong direction into the gasket according to the second embodiment of the present disclosure.
Figure 9A:
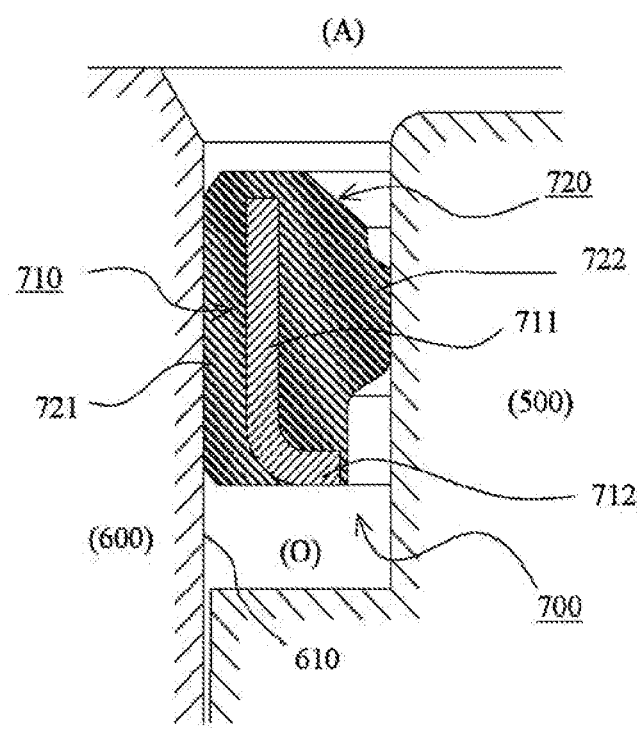
FIGS. 9A and 9B are schematic cross-sectional views of a sealing structure including a gasket according to a conventional example.
Figure 9B:
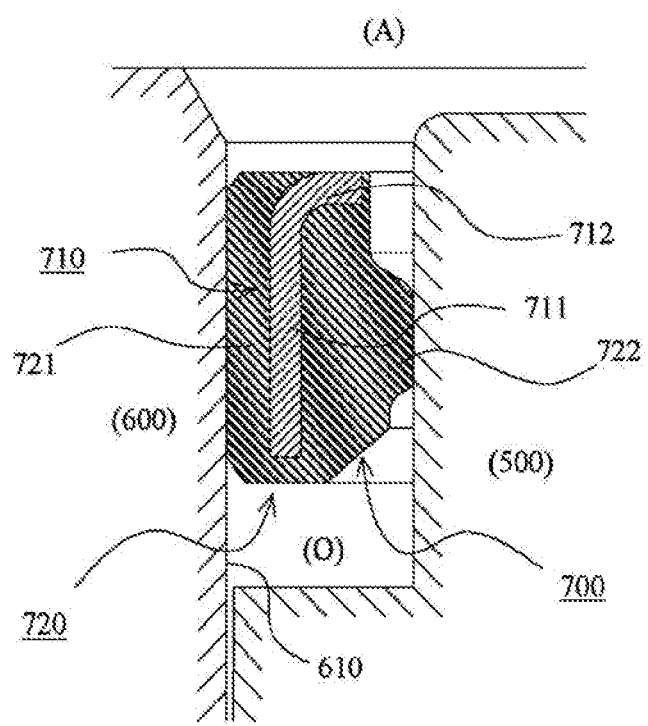

<Gasket Mounting Structure>
Referring particularly to FIGS. 7 and 8, a description will be given of a gasket mounting structure according to the present embodiment. FIG. 7 is a schematic cross-sectional view illustrating a situation where the gasket is being mounted according to the second embodiment of the present disclosure. FIG. 8 is a schematic cross-sectional view illustrating a situation where a jig is inserted in a wrong direction into the gasket according to the second embodiment of the present disclosure.

In the present embodiment, the gasket 100 is configured to be mounted in the insertion hole 610 of the housing 600X from the large-diameter inner peripheral surface portion 124 side. In other words, in the present embodiment, the gasket 100 is inserted using a jig 300 through the insertion hole 610 in the same direction as that in which the shaft 500 is inserted through the insertion hole 610.

The jig 300 includes a small-diameter outer peripheral surface portion 310 and a large-diameter outer peripheral surface portion 320 in order of increasing distance from a leading end side. The small-diameter outer peripheral surface portion 310 is configured to hold the gasket 100 by being press-fitted into an inner peripheral surface of the small-diameter inner peripheral surface portion 123 of the gasket 100. The large-diameter outer peripheral surface portion 320 is configured to have an outer diameter which is larger than the inner diameter of the large-diameter inner peripheral surface portion 124 and larger than an outer diameter of the small-diameter outer peripheral surface portion 310.

FIG. 7 illustrates a situation where the jig 300 is inserted into the gasket 100 from the small-diameter inner peripheral surface portion 123 side. In this case, a stepped surface 321 between the small-diameter outer peripheral surface portion 310 and the large-diameter outer peripheral surface portion 320 abuts on an end surface of the gasket 100 on the small-diameter inner peripheral surface portion 123 side to press-fit the small-diameter outer peripheral surface portion 310 into the inner peripheral surface of the small-diameter inner peripheral surface portion 123. This results in a state in which the gasket 100 is held by the jig 300. By inserting the gasket 100 into the insertion hole 610 of the housing 600X in a state in which the gasket 100 is thus held by the jig 300, it is possible to mount the gasket 100 in the insertion hole 610.

FIG. 8 illustrates a situation where the jig 300 is inserted into the gasket 100 from the large-diameter inner peripheral surface portion 124 side. In this case, the stepped surface 321 between the small-diameter outer peripheral surface portion 310 and the large-diameter outer peripheral surface portion 320 abuts on an end surface of the gasket 100 located on the large-diameter inner peripheral surface portion 124 side to form a space S between the small-diameter outer peripheral surface portion 310 and the large-diameter inner peripheral surface portion 124. Consequently, the gasket 100 cannot be held by the jig 300.
<Advantages of Gasket Mounting Structure According to Present Embodiment>
In the mounting structure for the gasket 100 according to the present embodiment, when the jig 300 is inserted into the gasket 100 from the small-diameter inner peripheral surface portion 123 side, the gasket 100 is held by the jig 300. Meanwhile, when the jig 300 is inserted into the gasket 100 from the large-diameter inner peripheral surface portion 124 side, the gasket 100 is not held by the jig 300. This prevents the gasket 100 from being mounted in a wrong mounting direction in a structure in which the gasket 100 is mounted in the insertion hole 610 from the large-diameter inner peripheral surface portion 124 side as in the present embodiment. This eliminates the need to paint the gasket 100 to prevent the gasket 100 from being mounted in a wrong direction. Since the gasket 100 is more reliably mounted in a correct direction, it is also possible to prevent the reinforcing ring 110 from rusting.

Further, in the present embodiment, the plurality of projections 123a to be compressed against the small-diameter outer peripheral surface portion 310 of the jig 300 are provided at intervals in the circumferential direction at the small-diameter inner peripheral surface portion 123 of the gasket 100. By providing the plurality of projections 123a described above, the small-diameter outer peripheral surface portion 310 of the jig 300 can be press-fitted into the inner peripheral surface of the small-diameter inner peripheral surface portion 123 of the gasket 100 without increasing a force required for the press-fitting and hold the gasket 100.

Each of the embodiments described above has shown a case where the reinforcing ring 110 includes the cylindrical portion 111 and the radially inward flange 112 provided at one end of the cylindrical portion 111. However, the reinforcing ring according to the present disclosure is also applicable to a case where the reinforcing ring includes a cylindrical portion and a radially outward flange provided at one end of the cylindrical portion. In addition, the reinforcing ring according to the present disclosure is also applicable to a case where the reinforcing ring includes only a cylindrical portion.

REFERENCE SIGNS LIST

100 Gasket
110 Reinforcing ring
111 Cylindrical portion
112 Radially inward flange
120 Seal main body
121 Outer peripheral seal portion
122 Seal projection
123 Small-diameter inner peripheral surface portion
123a Projection
124 Large-diameter inner peripheral surface portion
200 Jig
210 Small-diameter outer peripheral surface portion
220 Intermediate-diameter outer peripheral surface portion
221 Stepped surface
230 Large-diameter outer peripheral surface portion
231 Stepped surface
300 Jig
310 Small-diameter outer peripheral surface portion
320 Large-diameter outer peripheral surface portion
321 Stepped surface
500 Shaft
510 Outer peripheral surface
600, 600X Housing
610 Insertion hole

The invention claimed is:

1. A gasket mounting structure comprising:
a gasket configured to seal an annular gap between a housing and a shaft to be inserted into an insertion hole provided in the housing from a to-be-sealed side, which corresponds to an object to be sealed, toward an opposite side thereof; and
a jig,
wherein the gasket includes:
a reinforcing ring; and
a seal main body made of an elastic material and provided integrally with the reinforcing ring, wherein the seal main body integrally includes:
an outer peripheral seal portion to be fitted and fixed to an inner peripheral surface of the insertion hole;
a seal projection to be brought into close contact with an outer peripheral surface of the shaft, which is formed as part of an inner peripheral surface of the seal main body, a small-diameter inner peripheral surface portion, which is formed on a side of the seal projection closer to the to-be-sealed side, and
of a large-diameter inner peripheral surface portion, which is formed on a side of the seal projection closer to the side opposite to the to-be-sealed side, the large-diameter inner peripheral surface portion having an inner diameter larger than that of the small-diameter inner peripheral surface portion,
wherein the jig includes:
a small-diameter outer peripheral surface portion configured to be press-fitted into an inner peripheral surface of the seal projection so as to hold the gasket;
an intermediate-diameter outer peripheral surface portion having an outer diameter larger than the inner diameter of the small-diameter inner peripheral surface portion, smaller than the inner diameter of the large-diameter inner peripheral surface portion, and larger than an outer diameter of the small-diameter outer peripheral surface portion; and
a large-diameter outer peripheral surface portion having an outer diameter larger than the inner diameter of the large-diameter inner peripheral surface portion and larger than the outer diameter of the intermediate-diameter outer peripheral surface portion, and
wherein the gasket mounting structure is configured such that,
when the jig is inserted into the gasket from the large-diameter inner peripheral surface portion side, a stepped surface between the intermediate-diameter outer peripheral surface portion and the large-diameter outer peripheral surface portion abuts on an end surface of the gasket located on the large-diameter inner peripheral surface portion side to press-fit the small-diameter outer peripheral surface portion into the inner peripheral surface of the seal projection and result in a state in which the gasket is held by the jig, and
when the jig is inserted into the gasket from the small-diameter inner peripheral surface portion side, a stepped surface between the small-diameter outer peripheral surface portion and the intermediate-diameter outer peripheral surface portion abuts on an end surface of the gasket located on the small-diameter inner peripheral surface portion side to prevent the small-diameter outer peripheral surface portion from reaching a position at which the small-diameter outer peripheral surface portion can come into contact with the seal projection.

2. A gasket mounting structure comprising:
a gasket configured to seal an annular gap between a housing and a shaft to be inserted into an insertion hole provided in the housing from a to-be-sealed side, which corresponds to an object to be sealed, toward an opposite side thereof; and a jig, wherein the gasket includes:

a reinforcing ring; and a seal main body made of an elastic material and provided integrally with the reinforcing ring, wherein the seal main body integrally includes:
- an outer peripheral seal portion to be fitted and fixed to an inner peripheral surface of the insertion hole; and
- a seal projection to be brought into close contact with an outer peripheral surface of the shaft, which is formed as part of an inner peripheral surface of the seal main body, a small-diameter inner peripheral surface portion, which is formed on a side of the seal projection closer to the to-be-sealed side, and
- a large-diameter inner peripheral surface portion, which is formed on a side of the seal projection closer to the side opposite to the to-be-sealed side, the large-diameter inner peripheral surface portion having an inner diameter larger than that of the small-diameter inner peripheral surface portion, wherein the jig includes:
- a small-diameter outer peripheral surface portion configured to be press-fitted into an inner peripheral surface of the small-diameter inner peripheral surface portion so as to hold the gasket; and
- a large-diameter outer peripheral surface portion having an outer diameter larger than the inner diameter of the large-diameter inner peripheral surface portion and larger than an outer diameter of the small-diameter outer peripheral surface portion, and wherein the gasket mounting structure is configured such that;
- when the jig is inserted into the gasket from the small-diameter inner peripheral surface portion side, a stepped surface between the small-diameter outer peripheral surface portion and the large-diameter outer peripheral surface portion abuts on an end surface of the gasket located on the small-diameter inner peripheral surface portion side to press-fit the small-diameter outer peripheral surface portion into the inner peripheral surface of the small-diameter inner peripheral surface portion and result in a state in which the gasket is held by the jig, and
- when the jig is inserted into the gasket from the large-diameter inner peripheral surface portion side, the stepped surface between the small-diameter outer peripheral surface portion and the large-diameter outer peripheral surface portion abuts on an end surface of the gasket located on the large-diameter inner peripheral surface portion side to form a space between the small-diameter outer peripheral surface portion and the large-diameter inner peripheral surface portion.

3. The gasket mounting structure according to claim 2, wherein a plurality of projections to be compressed against the small-diameter outer peripheral surface portion are provided at intervals in a circumferential direction at the small-diameter inner peripheral surface portion.

* * * * *